United States Patent [19]

Kadowaki et al.

[11] Patent Number: 5,293,038

[45] Date of Patent: Mar. 8, 1994

[54] OPTICAL PICK-UP HEAD APPARATUS WHEREIN HOLLOGRAPHIC OPTICAL ELEMENT AND PHOTODETECTOR ARE FORMED ON SEMICONDUCTOR SUBSTRATE

[75] Inventors: Shinichi Kadowaki, Osaka; Yoshiaki Komma, Kyoto; Seiji Nishino, Osaka, all of Japan

[73] Assignee: Matsushita Electric Industrial Co., Ltd., Osaka, Japan

[21] Appl. No.: 35,777

[22] Filed: Mar. 23, 1993

[30] Foreign Application Priority Data

Apr. 8, 1992 [JP] Japan .................. 4-086852

[51] Int. Cl.[5] .................................. H01J 3/14
[52] U.S. Cl. ................... 250/216; 250/201.5; 369/44.23
[58] Field of Search ............ 250/216, 201.5, 201.2, 250/201.1, 202, 201.6; 369/44.23, 44.25, 44.37, 44.41, 44.14; 359/212, 218, 217, 214; 372/46, 50

[56] References Cited

U.S. PATENT DOCUMENTS

| | | |
|---|---|---|
| 4,665,310 | 5/1987 | Heemskerk . |
| 4,737,946 | 4/1988 | Yamashita et al. ............ 250/201.5 |
| 4,906,839 | 3/1990 | Lee . |
| 4,929,823 | 5/1990 | Kato et al. . |
| 5,218,584 | 6/1993 | Gfeller ............................ 369/44.23 |

FOREIGN PATENT DOCUMENTS

| | | |
|---|---|---|
| 0219908 | 4/1987 | European Pat. Off. . |
| 0348950 | 1/1990 | European Pat. Off. . |
| 0463295 | 1/1992 | European Pat. Off. . |
| 0467303 | 1/1992 | European Pat. Off. . |
| 58-162660 | 10/1983 | Japan . |
| 127286 | 1/1989 | Japan . |
| 146243 | 2/1989 | Japan . |
| 1150244 | 6/1989 | Japan . |
| 1303638 | 12/1989 | Japan . |
| 252487 | 2/1990 | Japan . |
| 2253678 | 10/1990 | Japan . |

Primary Examiner—David C. Nelms
Assistant Examiner—Que T. Le
Attorney, Agent, or Firm—Lowe, Price, LeBlanc & Becker

[57] ABSTRACT

An optical pick-up head apparatus to be used for recording and reproducing or erasing optical information on and from an optical storage medium. The head apparatus comprises a semiconductor laser source, a reflector, a reflection type holographic optical element and a photodetector. A laser beam emitted from the semiconductor laser source is incident through the reflector on the reflection type holographic optical element so as to be incident through an objective lens on the optical storage medium. The laser beam reflected and diffracted on the optical storage medium advances along the same path in the opposite direction to be incident on the reflection type holographic optical element to become diffraction beams. The diffraction beams are incident on the photodetector after being reflected on the reflector so as to obtain a focusing error signal, tracking error signal and information signal. The reflection type holographic optical element and the photodetector are formed on one semiconductor substrate, and the semiconductor laser source is disposed to be close to the photodetector on the semiconductor substrate. Due to this arrangement, the head apparatus can easily and accurately be assembled without the positional adjustment of the reflection type holographic optical element or the photodetector, thereby improving the mass productivity of the head apparatus.

25 Claims, 12 Drawing Sheets

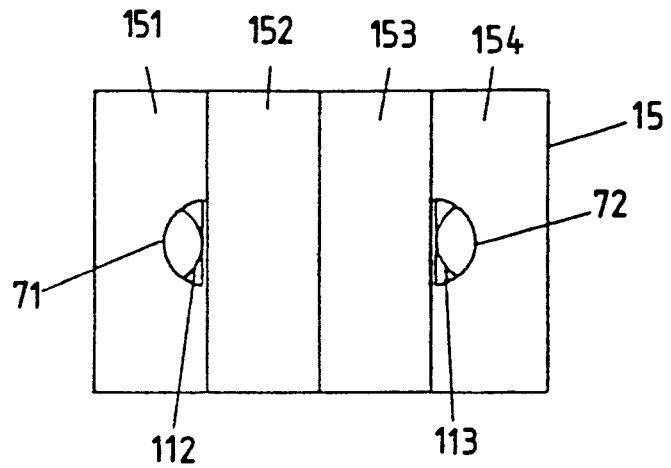
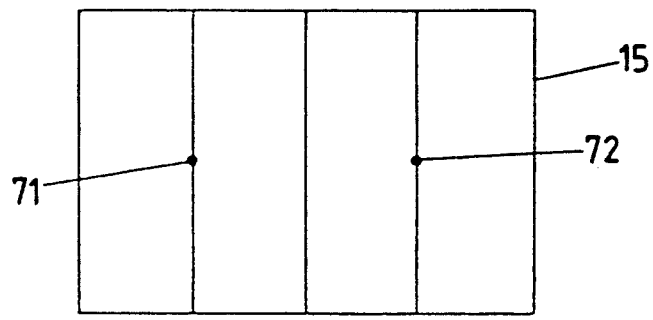
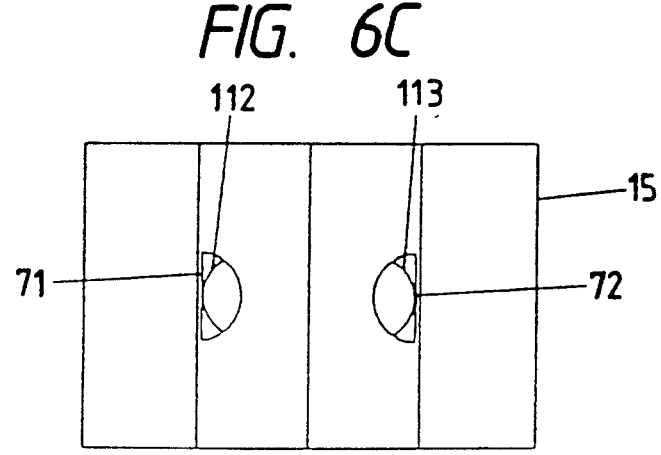

OPTICAL PICK-UP HEAD APPARATUS WHEREIN HOLLOGRAPHIC OPTICAL ELEMENT AND PHOTODETECTOR ARE FORMED ON SEMICONDUCTOR SUBSTRATE

BACKGROUND OF THE INVENTION

The present invention relates to an optical pick-up head apparatus which can be used for recording and reproducing or erasing optical information on and from an optical storage medium such as an optical disc and an optical card.

The optical memory technique utilizing a high-density and large-capacity storage medium such as an optical disc to record information by a pit-like pattern has been practiced as digital audio disc, video disc, document file disc and data file and has become widely applied to many fields. The reliability of the recording/reproduction of the optical information greatly depends upon the performance of an optical pick-up head apparatus used. Recently, for mass production of an optical pick-up head apparatus, attempts to form optical devices on a semiconductor substrate are made, for example, the Japanese Utility Model Provisional Publication No. 58-162660 discloses a semiconductor apparatus in which a semiconductor laser, a reflector and a photodetector are formed in the same semiconductor substrate and the Japanese Patent Provisional Publication No. 2-52487 discloses an optical pick-up head apparatus in which a surface emitting laser is disposed on a photodetector. Further, the Japanese Patent Provisional Publications Nos. 1-46243, 1-150244 and 2-253678 disclose optical pick-up head apparatus in which a photodetector and a reflector are formed in one semiconductor substrate and a semiconductor laser is disposed on the same semiconductor substrate.

FIG. 1 shows a conventional semiconductor apparatus as exemplified in the Japanese Utility Model Provisional Publication No. 58-162660. In FIG. 1, in this apparatus, on a semiconductor substrate 1 there are formed a semiconductor laser element 2 and a reflection surface 3 whereby a laser beam emitted from the semiconductor laser 2 is reflected in a direction perpendicular to a surface of the semiconductor substrate 1 as indicated by an arrow A. Further, a photodetector 4 is disposed on the surface of the semiconductor substrate 1 to receive an incident light beam as indicated by an arrow B. FIG. 2 shows an optical pick-up head apparatus using as a light source the semiconductor apparatus as shown in FIG. 1, which apparatus is exemplified in the Japanese Patent Provisional Publication No. 64-27286. In FIG. 2, the laser beam A emitted from the semiconductor laser 2 and then reflected on the reflection surface 3 passes through a holographic optical element 5 and is converged by an objective lens 6 to be focused on an optical storage medium 7. At this time, the laser beam A is intensity-modulated in accordance with information recorded in the optical storage medium 7 and reflected therefrom. This reflected beam again passes through the objective lens 6 to be incident on the holographic optical element 5. Here, this holographic optical element 5 has a function to generate a diffraction beam having an astigmatic aberration with respect to the reflected beam from the optical storage medium 7. This diffraction beam from the holographic optical element 5 is incident as the beam B on the photodetector 4. The photodetector 4 is divided into four areas which outputs electric signals in correspondence with the incident beams, respectively. The electric signals of the four-divided photodetector 4 are supplied to an adequate electric circuit to perform appropriate operations to provide a focusing error (FE) signal, a tracking error (TE) signal and an information (RF) signal corresponding to the information signal recorded on the optical storage medium 7.

In FIG. 2 optical pick-up head apparatus, since the semiconductor laser 2 and the photodetector 4 are formed on the same semiconductor substrate 1, the alignment therebetween can be made with an extremely high accuracy below 1 micron. However, the holographic optical element 5 is constructed as a different part spatially separated therefrom, and hence, in assembling the optical pick-up head apparatus, there is a problem that the holographic optical element 5 is required to be rotationally adjusted so that the beam from the holographic optical element 5 is incident on a desired position on the photodetector 4.

SUMMARY OF THE INVENTION

It is therefore an object of the present invention to provide an optical pick-up head apparatus which is capable of arranging the photodetector, semiconductor laser and holographic optical element with a high accuracy without requiring such a rotational or positional adjustment in assembling.

In according with the present invention, there is provided an optical pick-up head apparatus comprising: a semiconductor laser source for emitting a coherent or semi-monochromatic beam; first reflection means for reflecting the beam from the semiconductor laser source to change the advancing direction of the beam therefrom; second reflection means for reflecting the beam reflected on the first reflection means to change the advancing direction thereof; third reflection means for reflecting the beam reflected on the second reflection means to change the advancing direction thereof; a converging optical system for receiving the beam reflected on the third reflection means to focus the beam on a microscopic spot on an optical storage medium; a reflection type holographic optical element for receiving the beam reflected and diffracted on the optical storage medium to generate a diffraction beam; and a photodetector having a plurality of photodetecting elements (light-receiving surfaces) to receive the diffraction beam from the reflection type holographic optical element to generate a photoelectric conversion signal, wherein the laser source is formed on a first semiconductor substrate so that the beam from the laser source is emitted in a direction substantially parallel to a surface of the first semiconductor substrate, the reflection type holographic optical element is formed in the third reflection means, the diffraction beam from the reflection type holographic optical element is incident on the photodetector after being reflected on the second reflection means, the first reflection means, the third reflection means and the photodetector are formed on a second semiconductor substrate, a light-receiving surface of the photodetector is arranged to be substantially parallel to a surface of the second semiconductor substrate, and the surface of the first semiconductor substrate is disposed to be substantially parallel to the surface of the second semiconductor substrate.

It is also appropriate that a diffraction grating is disposed in an optical path of the beam from the semiconductor laser source to the reflection type holographic optical element.

Further, according to this invention, there is provided an optical pick-up head apparatus comprising: a semiconductor laser source for emitting a coherent or semi-monochromatic beam; first reflection means for reflecting the beam from the semiconductor laser source to change the advancing direction of the beam therefrom; second reflection means for reflecting the beam reflected on the first reflection means to change the advancing direction thereof; third reflection means for reflecting the beam reflected on the second reflection means to change the advancing direction thereof; a converging optical system for receiving the beam reflected on the third reflection means to focus the beam on a microscopic spot on an optical storage medium; a reflection type holographic optical element for receiving the beam reflected and diffracted on the optical storage medium to generate a diffraction beam; and a photodetector having a plurality of photodetecting elements to receive the diffraction beam from the reflection type holographic optical element to generate a photoelectric conversion signal, wherein the laser source and the first reflection means are formed on a first semiconductor substrate, the beam from the laser source is emitted in a direction substantially parallel to a surface of the first semiconductor substrate, the reflection type holographic optical element is formed in the third reflection means, the diffraction beam from the reflection type holographic optical element is incident on the photodetector after being reflected on the second reflection means, the third reflection means and the photodetector are formed on a second semiconductor substrate, a light-receiving surface of the photodetector is arranged to be substantially parallel to a surface of the second semiconductor substrate, and the surface of the first semiconductor substrate is disposed to be substantially parallel to the surface of the second semiconductor substrate.

Still further, according to this invention, there is provided an optical pick-up head apparatus comprising: a semiconductor laser source for emitting a coherent or semi-monochromatic beam; first reflection means for reflecting the beam from the semiconductor laser source to change the advancing direction of the beam therefrom; second reflection means for reflecting the beam reflected on the first reflection means to change the advancing direction thereof; third reflection means for reflecting the beam reflected on the second reflection means to change the advancing direction thereof; a converging optical system for receiving the beam reflected on the third reflection means to focus the beam on a microscopic spot on an optical storage medium; a reflection type holographic optical element for receiving the beam reflected and diffracted on the optical storage medium to generate a diffraction beam; and a photodetector having a plurality of photodetecting elements to receive the diffraction beam from the reflection type holographic optical element to generate a photoelectric conversion signal, wherein the laser source, the first reflection means, the third reflection means and the photodetector are formed on one semiconductor substrate, the beam from the laser source is emitted in a direction substantially parallel to a surface of the semiconductor substrate, the reflection type holographic optical element is formed in the third reflection means, the diffraction beam from the reflection type holographic optical element is incident on the photodetector after being reflected on the second reflection means, and a light-receiving surface of the photodetector is arranged to be substantially parallel to a surface of the semiconductor substrate.

In addition, according to this invention, there is provided an optical pick-up head apparatus comprising: a semiconductor laser source for emitting a coherent or semi-monochromatic beam; first reflection means for reflecting the beam from the semiconductor laser source to change the advancing direction of the beam therefrom; second reflection means for reflecting the beam reflected on the first reflection means to change the advancing direction thereof; a converging optical system for receiving the beam reflected on the second reflection means to focus the beam on a microscopic spot on an optical storage medium; a reflection type holographic optical element for receiving the beam reflected and diffracted on the optical storage medium to generate a diffraction beam; and a photodetector having a plurality of photodetecting elements to receive the diffraction beam from the reflection type holographic optical element to generate a photoelectric conversion signal, wherein the reflection type holographic optical element is formed in the second reflection means, the diffraction beam from the reflection type holographic optical element is incident on the photodetector after being reflected on the first reflection means, the laser source is formed on a first semiconductor substrate, the beam from the laser source is emitted in a direction substantially parallel to a surface of the first semiconductor substrate, the second reflection means and the photodetector are formed on a second semiconductor substrate, a light-receiving surface of the photodetector is arranged to be substantially parallel to a surface of the second semiconductor substrate, and the first semiconductor substrate is disposed on the second semiconductor substrate so that the surface of the first semiconductor substrate is substantially parallel to the surface of the second semiconductor substrate.

Moreover, according to this invention, there is provided an optical pick-up head apparatus comprising: a semiconductor laser source for emitting a coherent or semi-monochromatic beam; first reflection means for reflecting the beam from the semiconductor laser source to change the advancing direction of the beam therefrom; second reflection means for reflecting the beam reflected on the first reflection means to change the advancing direction thereof; a converging optical system for receiving the beam reflected on the second reflection means to focus the beam on a microscopic spot on an optical storage medium; a reflection type holographic optical element for receiving the beam reflected and diffracted on the optical storage medium to generate a diffraction beam; and a photodetector having a plurality of photodetecting elements to receive the diffraction beam from the reflection type holographic optical element to generate a photoelectric conversion signal, wherein the reflection type holographic optical element is formed in the second reflection means, the diffraction beam from the reflection type holographic optical element is incident on the photodetector after being reflected on the first reflection means, the laser source, the second reflection means and the photodetector are formed on one semiconductor substrate, the beam from the laser source is emitted in a direction substantially parallel to a surface of the semiconductor substrate, and a light-receiving surface of the photodetector is arranged to be substantially parallel to a surface of the semiconductor substrate.

In the optical pick-up head apparatus, preferably, a reflection type diffraction grating is provided in the first or second reflection means and a second photodetector is disposed on the semiconductor substrate for receiving a portion of the beam from the semiconductor laser source which is not reflected and diffracted on the optical storage medium. The second photodetector is disposed to surround the reflection type holographic optical element.

BRIEF DESCRIPTION OF THE DRAWINGS

The object and features of the present invention will become more readily apparent from the following detailed description of the preferred embodiments taken in conjunction with the accompanying drawings in which:

FIGS. 6A to 6C are illustrations for describing a signal detecting method in this invention;

DETAILED DESCRIPTION OF THE INVENTION

First Embodiment

Figure 4:
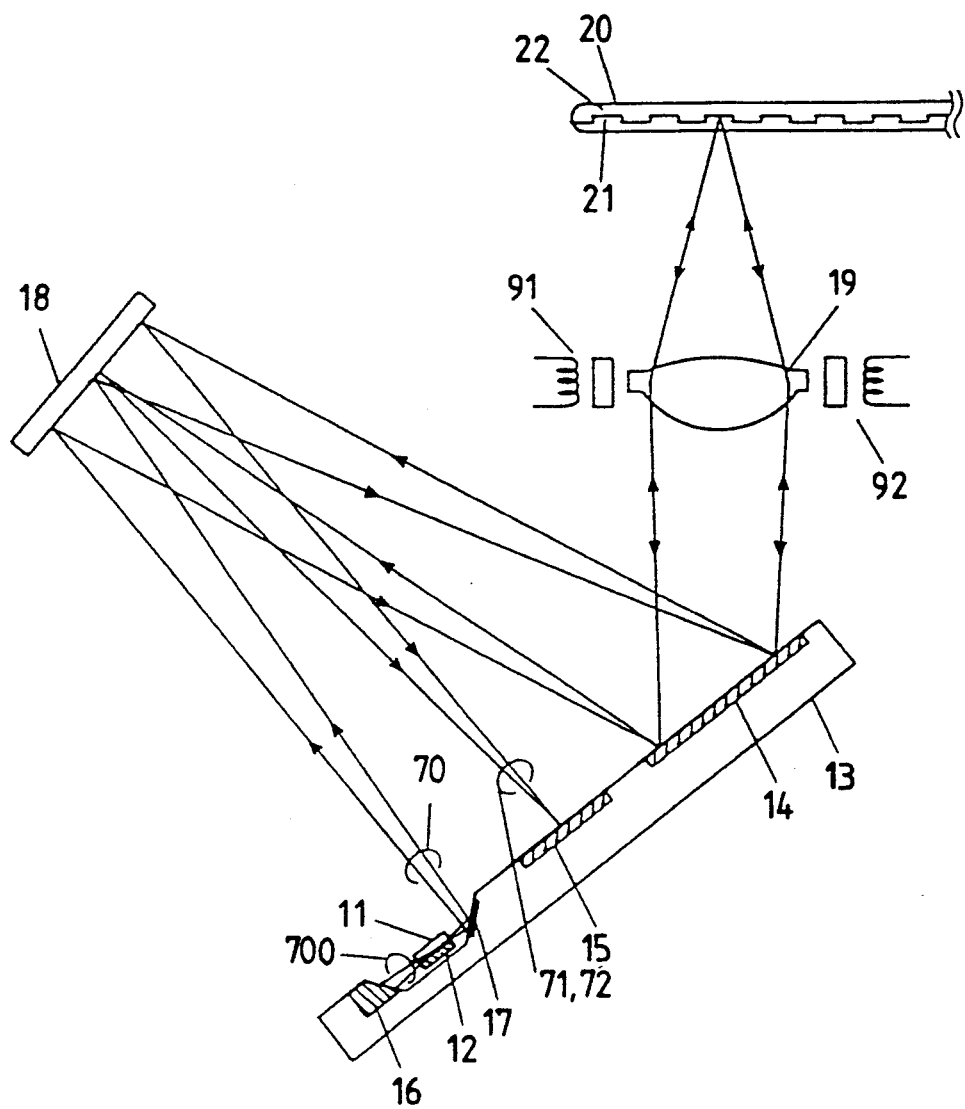
FIG. 4 shows an arrangement of an optical pick-up head apparatus according to a first embodiment of this invention.

A description will be made hereinbelow with reference to FIG. 4 in terms of an optical pick-up head apparatus according to a first embodiment of the present invention. In FIG. 4, designated at numeral 11 is a semiconductor laser source arranged to generate a coherent light beam (for example, wavelength $\lambda = 780$ nm) 70 from its one end (front end) and formed on a first semiconductor substrate 12. This first semiconductor substrate 12 is mounted on a second semiconductor substrate 13. The first semiconductor substrate 12 is made of GaAs and the second semiconductor substrate is made of Si. Designated at numerals 15 and 16 are photodetectors formed on the second semiconductor substrate 13. The photodetector 15 is composed of a plurality of photodetecting elements (light-receiving surfaces) and the photodetector 16 is composed of one photodetecting element. In addition, on the second semiconductor substrate 13 there are formed first and third reflecting portions 17 and 14. In the third reflecting portion 14, a hologram is formed. That is, the third reflecting portion 14 acts as a reflection type holographic optical element. Here, the reflection type holographic optical element 14 is blazed in order to suppress generation of unnecessary diffraction beams causing noises.

The semiconductor laser source 11 generates a laser beam toward the first reflector 17 in a direction parallel to the surface of the first semiconductor substrate 12. After being reflected on the first reflector 17, the beam 70 advances toward a second reflector 18 to be reflected thereon. The reflected beam from the second reflector 18 advances to be incident on the reflection type holographic optical element 14 formed on the second semiconductor substrate 13. The reflected beam on the reflection type holographic optical element 14 passes through an objective lens 19 so as to be converged to be focused on an optical storage medium 20 comprising a transparent substrate 21 having grooves or pits and a protective film 20 covering the transparent substrate 21. Here, since the reflection type holographic optical element 14 is blazed as described above, it is possible to prevent a diffraction beam generated due to the holographic optical element 14 from being incident as noises on the photodetector 15.

The beam reflected and diffracted on the optical storage medium 20 advances along the return path, that is, the reflected and diffracted beam thereon is incident on the reflection type holographic optical element 14 after passing through the objective lens 19. The incident beam on the reflection type holographic optical element 14 is reflected whereby a plurality of diffraction beams generate. The zero order diffraction beam from the reflection type holographic optical element 14 advances along the same path in the opposite direction to be incident on the semiconductor laser source 11, that is, returns to the semiconductor laser source 11 after reflections on the second reflector 18 and the first reflector 17. On the other hand, the first order diffraction beams 71 and 72 from the reflection type holographic optical element 14 are incident on the photodetector 15 after being reflected on the second reflector 18. The relation between the hologram pattern recorded in the reflection type holographic optical element 14 and the first order diffraction beams 71, 72 and the methods to detecting the FE signal, TE signal and RF signal will hereinafter be described in detail.

The semiconductor laser source 11 also generates a laser beam 700 from its other end (rear end) toward the photodetector 16. This laser beam 700 is incident on the photodetector 16 to be converted into an electric signal which is in turn used as a reference signal for a control circuit, not shown, to keep the output of the semiconductor laser source 11 constant.

In this embodiment, the photodetector 15 and the reflection type holographic optical element 14 are formed on the same semiconductor substrate. In this case, because of manufacturing it in accordance with the planor technology, the relative positional relation therebetween can be determined at a high accuracy below about 1 micron. Thus, in assembling, it is not required to perform the positional or rotational adjustment of the photodetector 15 and the reflection type holographic optical element 14. In addition, since the semiconductor laser source 11 is disposed at a position extremely close spatially to the second semiconductor substrate 13, as compared with the case that the semiconductor laser source 11 is spatially separated therefrom, it is possible to heighten the positional accuracy of the semiconductor laser source 11. Further, for example, if alignment marks are formed on the semiconductor substrate 13 and the semiconductor laser source 11, it is possible to mount the semiconductor laser source 11 on a desired position of the semiconductor substrate 13 with a high accuracy (for example, accuracy of several $\mu m$). As a result, it is possible to take the relative positional relation between the photodetector 15 and the semiconductor laser source 11 with a high accuracy. That is, the semiconductor laser source 11, reflection type holographic optical element 14 and the photodetector 15 can stably be arranged with a high accuracy. Even if the second reflector 18, objective lens 19 and the second semiconductor substrate 13 are slightly shifted from the normal positions in assembling the optical pick-up head apparatus, according to this embodiment, since the semiconductor laser source 11, reflection type holographic optical element 14 and the photodetector 15 can stably be arranged with a high accuracy and the semiconductor laser source 11 and the photodetector 15 take a substantial conjugate relation to each other, the first order diffraction beams 71 and 72 to be incident on the photodetector 15 scarcely varies, thereby preventing the deterioration of the FE signal, TE signal and RF signal to be detected. In other words, even if the optical pick-up head apparatus is assembled without adjustment, the optical pick-up head apparatus can stably obtain signals required. Thus, this embodiment can increase the mass productivity of the optical pick-up head apparatus and decrease the assembling cost thereof.

Figure 5:
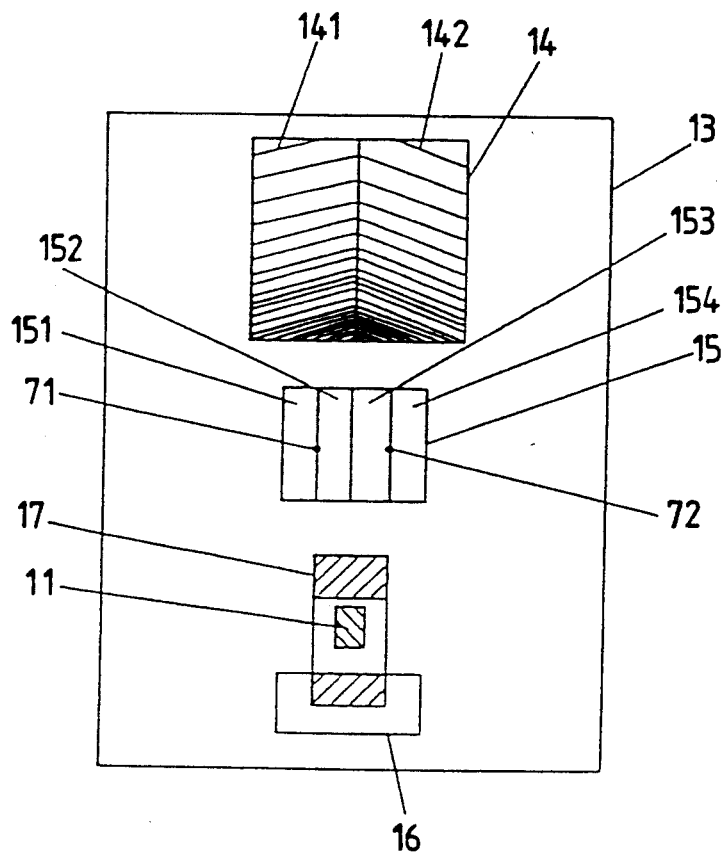
FIG. 5 is a top view showing a semiconductor substrate to be used in the FIG. 4 optical pick-up head apparatus.

FIG. 5 is a top view of the second semiconductor substrate 13. In FIG. 5, the reflection type holographic optical element 14 has two hologram areas 141 and 142 which produce the first order diffraction beams 71 and 72, respectively. The photodetector 15 has four photodetecting elements 151, 152, 153 and 154. The first order diffraction beam 71 from the reflection type holographic optical element 14 is received by the photodetecting elements 151 and 152 and the first order diffraction beam 72 therefrom is received by the photodetecting elements 153 and 154. Each of the hologram areas 141 and 142 can be realized with the semiconductor laser source 11 and the converged point of the beam received at a desired position on the photodetector 15 being taken as virtual light sources and an interference pattern made on the reflection type holographic optical element 14 by the beams emitted from these light sources being calculated and recorded on the hologram area. In practice, when recording the patterns the hologram areas 141, 142 on the semiconductor substrate 13, the patterns of the reflection type hologram areas 141 and 142 is formed on a photomask and the reflection type holographic optical element 14 is formed on the semiconductor substrate 13 using the photomask and techniques such as exposure and etching generally taken in the semiconductor apparatus manufacturing process. Similarly, the reflector 17 can be formed on the semiconductor substrate 13 in accordance with such techniques. As well as the semiconductor apparatus, a large number of semiconductor substrate 13 each having the reflection type holographic optical element 14 can be manufactured from one semiconductor substrate wafer.

Secondly, a detailed description will be made hereinbelow in terms of signal detecting methods in this embodiment. FIGS. 6A to 6C show the first order diffraction beams 71 and 72 relative to the respective photodetecting elements 151 to 154 of the photodetector 15 in the optical pick-up head apparatus illustrated in FIG. 4. FIG. 6B shows the case that the beam 70 emitted from the semiconductor laser source 11 is focused on the optical storage medium 20, and FIGS. 6A and 6C respectively show the cases that the beam 70 therefrom takes defocusing states with respect to the optical storage medium 20. The FE signal can be obtained by performing the differential operation between the sum of the outputs of the photodetecting elements 151 and 154 and the sum of the outputs of the photodetecting elements 152 and 153. This FE signal detecting method is so-called double knife edge method. After necessary processes such as amplification, phase-compensation and band-limitation, the FE signal is supplied to a focusing control actuator 91 shown in FIG. 4 whereby the position of the objective lens 19 in the focusing direction is controlled so that the focal point of the objective lens 19 is at a desired position on the optical storage medium 20. On the other hand, the TE signal can be obtained by performing the differential operation between the sum of the outputs of the photodetecting elements 151, 152 and the sum of the outputs of the photodetecting elements 153, 154 under the condition that the relation between farfield patterns of the first order diffraction beams 71, 72 and the photodetecting elements 151 to 154 is taken as illustrated in FIG. 6A, that is, the image corresponding to the track or pit train due to each of the first order diffraction beams 71, 72 is arranged to be substantially parallel to the elongating directions of the photodetecting elements 151 to 154. This TE signal detecting method is so-called push-pull method. As well as the FE signal, after necessary processes such as amplification, phase-compensation and band-limitation, the TE signal is supplied to a tracking control actuator 92 as illustrated in FIG. 4 whereby the position of the objective lens 19 in the radial direction of the optical storage medium 20 is controlled so that the focal point of the objective lens 19 is at a desired position such as a pit, track and land of the optical storage medium 20. Further, the RF signal can be obtained on the basis of the total sum of the outputs of the photodetecting elements 151 to 154. The RF signal is led to a signal processing circuit, not shown, to reproduce the information recorded in the optical storage medium 20. An optical pick-up head apparatus using the double edge method and push-pull method to obtain the FE signal and the TE signal is known as exemplified in U.S. Pat. No. 4,665,310.

Figure 1:
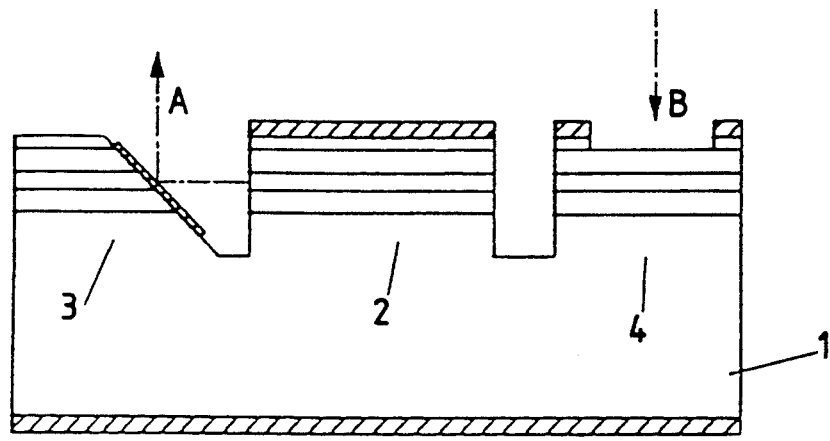
FIG. 1 is a cross-sectional view showing a conventional semiconductor apparatus.
Figure 2:
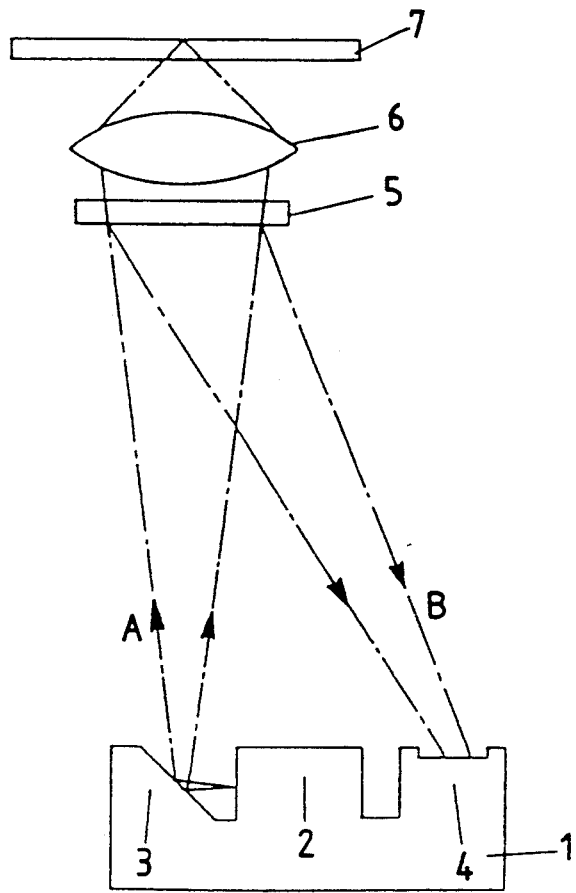
FIG. 2 is an illustration of an arrangement of an optical pick-up head apparatus including FIG. 1 semiconductor apparatus.
Figure 3:
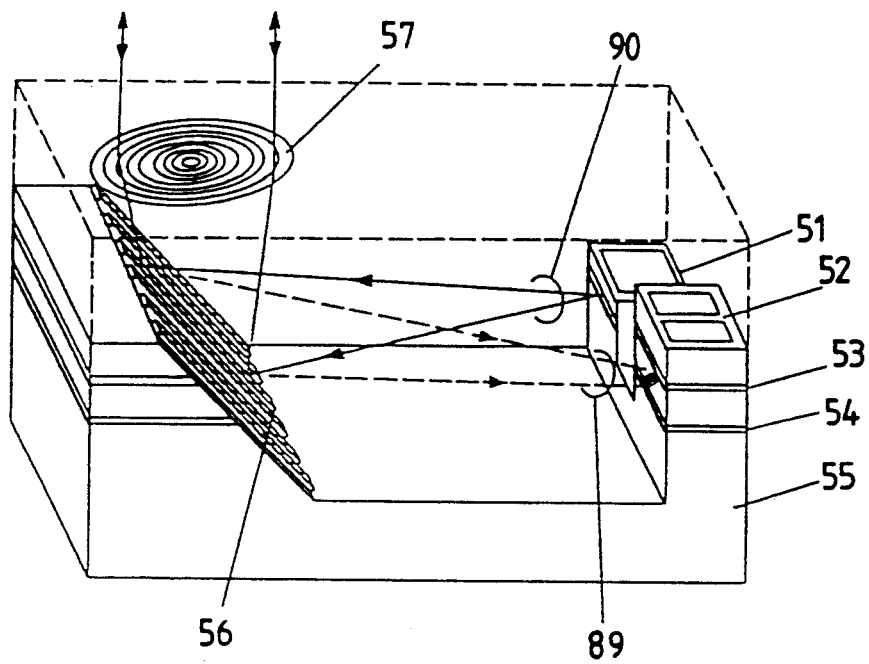
FIG. 3 is a perspective view showing a conventional optical pick-up apparatus.

Here, an effect of this invention will be described in comparison with an optical pick-up head apparatus illustrated in FIG. 3 and disclosed in the Japanese Patent Provisional Publication No. 1-303638. In FIG. 3, numeral 51 designates a semiconductor laser source, 52 represents a photodetector, 53, 54 denote active layers, 55 depicts a semiconductor substrate, 56 indicates a reflection type holographic optical element, and 57 is a Fresnel's collimating lens. A beam 90 emitted from the semiconductor laser source 51 is reflected and diffracted on an optical storage medium and then incident on the reflection type holographic optical element 56 so as to produce a diffraction beam 89 which is in turn incident on the photodetector 52. In the FIG. 3 optical pick-up head apparatus, the diffraction beam 89 from the reflection type holographic optical element 56 is directly received by the photodetector 52. At this time, the light-receiving portion of the photodetector 52 is required to be formed in a plane perpendicular to the semiconductor substrate 55 disposed between the active layers 54 and 53. This region is required to be formed through the crystal growth. Generally, the width of the light-receiving portion is required to be about 10 to 100 microns and hence a very long time is required for the crystal growth. On the other hand, according to this invention, since the diffraction beams 71 and 72 from the reflection type holographic optical element 14 are first reflected on the reflector 18 and then incident on the photodetector 15 and the photodetector 15 is formed in a plane parallel to the surface of the semiconductor substrate 13, the photodetector 15 can be formed for a short time period without the crystal growth. In addition, in the FIG. 3 optical pick-up head apparatus, when the semiconductor laser source 51 is arranged to be close to the reflection type holographic optical element 56, the pattern of the reflection type holographic optical element 56 becomes very fine or minute, whereby difficulty is encountered to form the pattern of the reflection type holographic optical element 56. Accordingly, the distance between the semiconductor laser source 51 and the reflection type holographic optical element 56 is preferable to be above 1 mm in practice. However, because the reflection type holographic optical element 56 is formed in a plane inclined with respect to the surface of the semiconductor substrate 55, as the reflection type holographic optical element 56 is separated from the semiconductor laser source 51, the thickness of the semiconductor substrate 55 is required to be increased. In addition, the time necessary for the etching to form the reflection type holographic optical element 56 becomes long. On the other hand, according to this invention, the reflection type holographic optical element 14 is formed in a plane parallel to the surface of the semiconductor substrate 13 and disposed at a position sufficiently separated from the semiconductor laser light source 11, and hence it is possible to prevent the pattern of the reflection type holographic optical element 14 from becoming fine and further prevent the time necessary for the etching from becoming long in manufacturing. Further, although in this invention the reflector 17 is also formed by the etching of the semiconductor substrate 13, any pattern is not formed in the reflector 17 and therefore the reflector 17 can be disposed at a position close to the semiconductor laser light source 11. Thus, it is possible to reduce the thickness of the semiconductor substrate 13 to shorten the time necessary for the etching.

Second Embodiment

Figure 7:
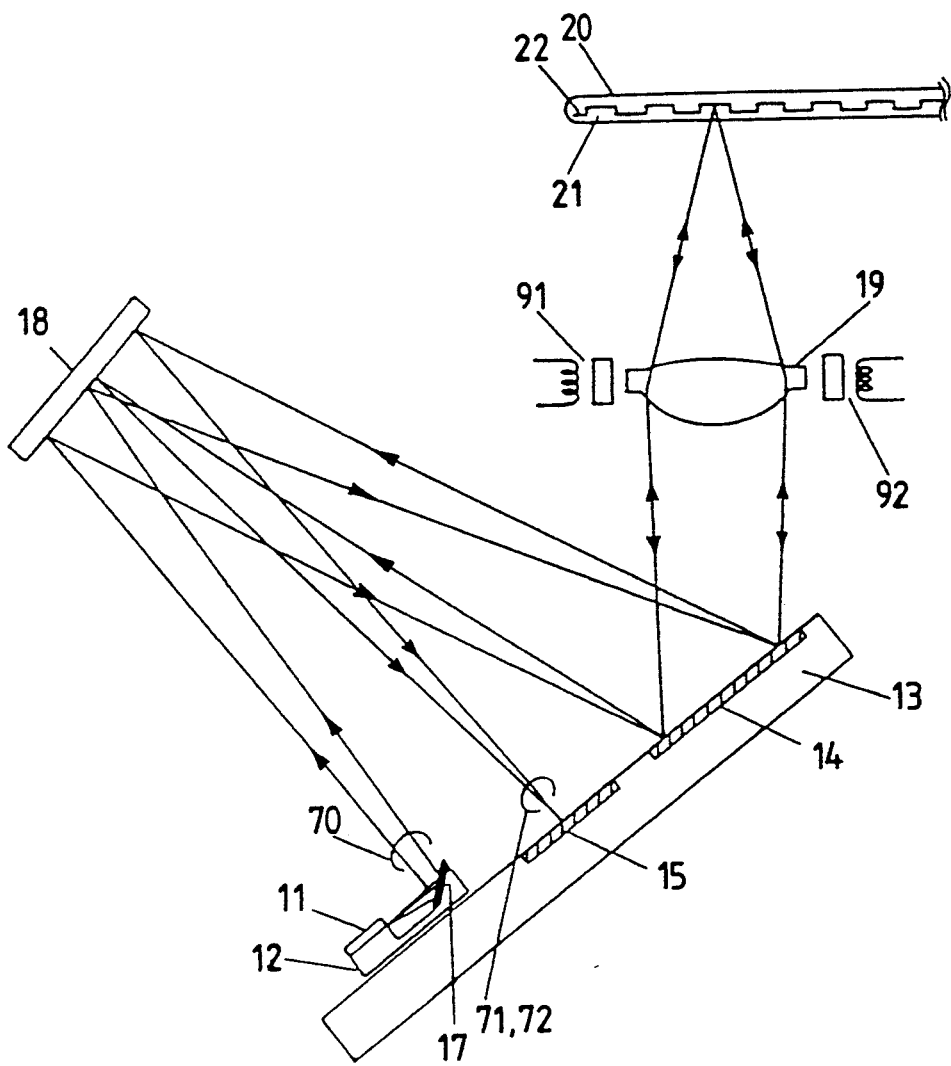
FIG. 7 shows an arrangement of an optical pick-up head apparatus according to a second embodiment of this invention.

A description will be made hereinbelow in terms of a second embodiment of this invention. FIG. 7 shows an optical pick-up head apparatus according to the second embodiment of this invention where parts corresponding to those in FIG. 4 are marked with the same numerals and the description thereof will be omitted for brevity. Although in the above-described first embodiment the first reflector 17, photodetector 15 and reflection type holographic optical element 14 are formed on the same semiconductor substrate 13 and the semiconductor laser source 11 is formed on the semiconductor substrate 12, in this embodiment the semiconductor laser source 11 and the first reflector 17 are formed on the semiconductor substrate 12 and the photodetector 15 and the reflection type holographic optical element 14 are formed on the semiconductor substrate 13. In FIG. 7, as well as the first embodiment, the beam 70 emitted from the semiconductor laser source 11 is successively reflected on the reflectors 17, 18 and the reflection type holographic optical element 14 and then focused on the optical storage medium 20 through the objective lens 19. The beam 70 reflected and diffracted on the optical storage medium 20 is incident on the reflection type holographic optical element 14 to become the first order diffraction beams 71 and 72. The first order diffraction beams 71 and 72 are reflected on the reflector 18 and then incident on the photodetector 15. As well as the first embodiment, since the photodetector 15 and the reflection type holographic optical element 14 are also formed on the same semiconductor substrate 13, the relative positional relation between the photodetector 15 and the reflection type holographic optical element 14 can be determined at a high accuracy below about 1 micron, thereby not requiring the positional or rotational adjustment of the reflection type holographic optical element 14 or the photodetector 15 in assembling the optical pick-up head apparatus. In addition, since the semiconductor laser source 11 is mounted on the semiconductor substrate 13, i.e., disposed at a position extremely close spatially to the semiconductor substrate 13, the positional accuracy of the semiconductor laser source 11 becomes high. Accordingly, it is possible to stably arrange the semiconductor laser source 11, reflection type holographic optical element 14 and photodetector 15 with an extremely high accuracy. Even if the positions of the reflector 18, objective lens 19 and semiconductor substrate 13 are slightly shifted from the normal positions, according to this embodiment, since the semiconductor laser source 11, reflection type holographic optical element 14 and photodetector 15 can stably be arranged with a high accuracy and the semiconductor laser source 11 and photodetector 15 take a substantial conjugate relation to each other, the first order diffraction beams 71 and 72 to be received by the photodetector 15 scarcely vary, thereby preventing the deterioration of the FE, TE and RF signals. That is, because of scarcely requiring the adjustment in assembling, the mass productivity can be increased to reduce the assembling cost of the optical pick-up head apparatus.

Third Embodiment

Figure 8:
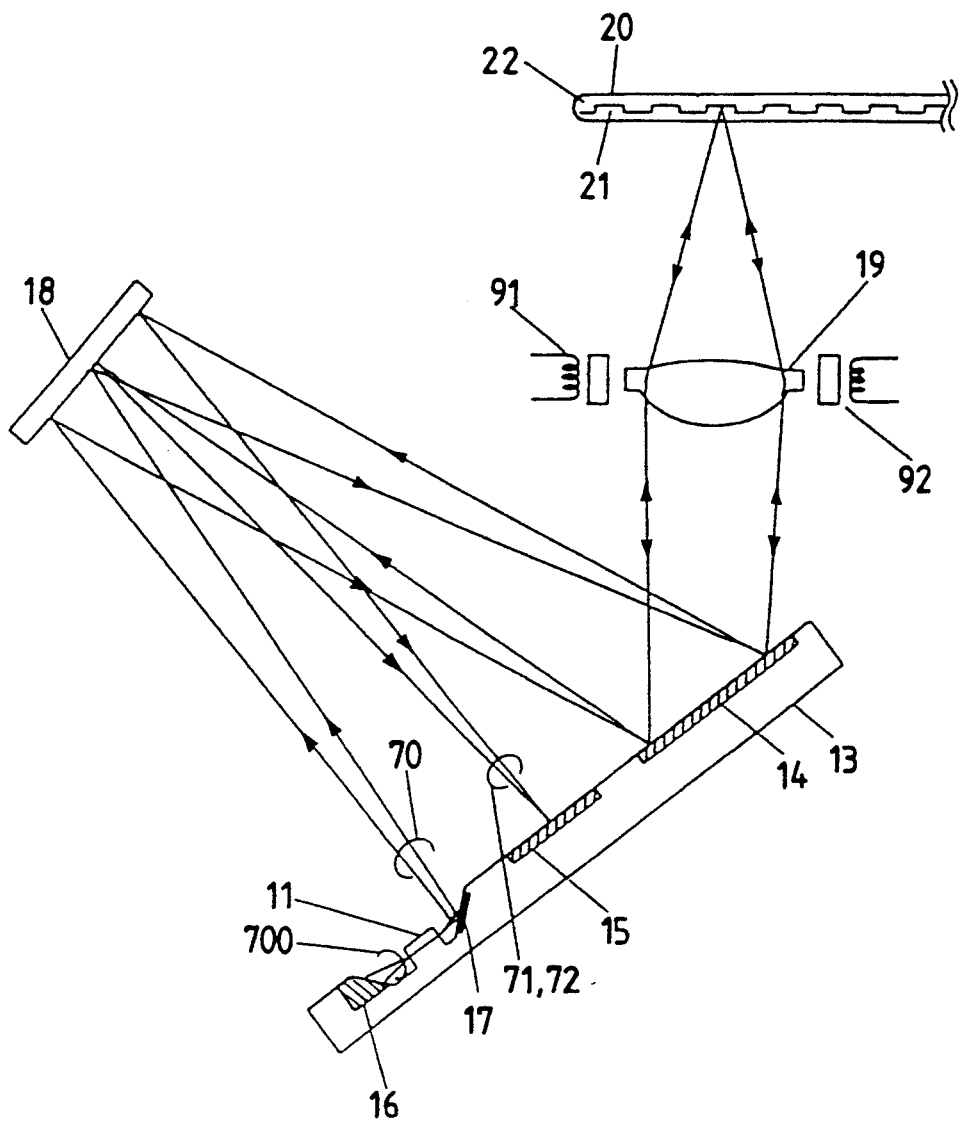
FIG. 8 shows an arrangement of an optical pick-up head apparatus according to a third embodiment of this invention.

Further, a description will be made hereinbelow in terms of a third embodiment of this invention. FIG. 8 shows an optical pick-up head apparatus according to the third embodiment of this invention where parts corresponding to those in FIGS. 4 or 7 are marked with the same numerals and the description thereof will be omitted for brevity. Although in the above-described first embodiment the first reflector 17, photodetector 15 and reflection type holographic optical element 14 are formed on the same semiconductor substrate 13 and the semiconductor laser source 11 is formed on the semiconductor substrate 12, in this embodiment the semiconductor laser source 11, first reflector 17, photodetector 15 and reflection type holographic optical element 14 are formed on the semiconductor substrate 13. Thus, the relative positional relation between the semiconductor laser source 11, photodetector 15 and the reflection type holographic optical element 14 can be determined with a high accuracy below about 1 micron, thereby not requiring the positional or rotational adjustment of the reflection type holographic optical element 14 or the photodetector 15 in assembling the optical pick-up head apparatus. As well as the above-described first and second embodiments, according to this embodiment, it is possible to stably obtain the signals without requiring such an adjustment. In addition, although in the first and second embodiments the semiconductor laser source 11 is required to be mounted on the semiconductor substrate 13, this embodiment does not require such a mounting work, thereby improving the mass productivity.

Fourth Embodiment

Figure 9:
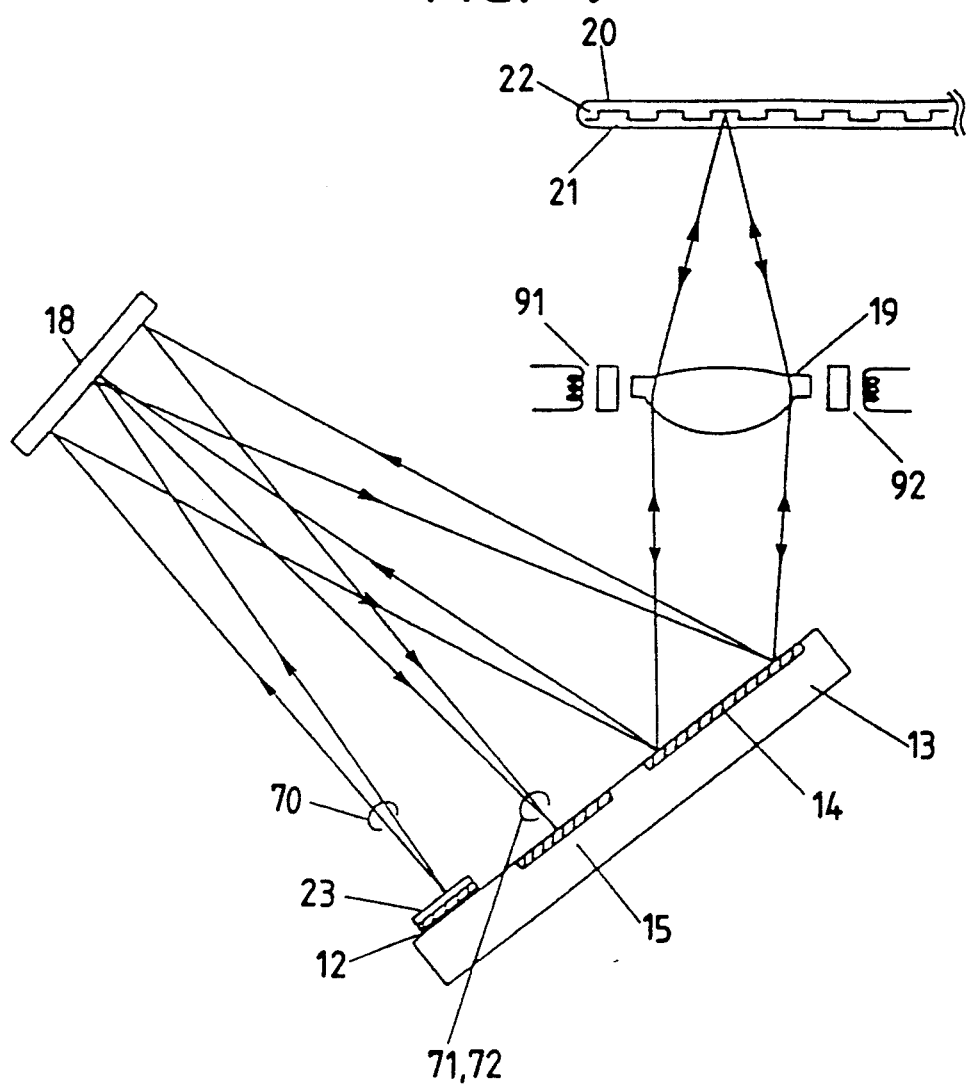
FIG. 9 shows an arrangement of an optical pick-up head apparatus according to a fourth embodiment of this invention.

Moreover, a description will be made hereinbelow in terms of a fourth embodiment of this invention. FIG. 9 shows an optical pick-up head apparatus according to the fourth embodiment of this invention where parts corresponding to those in FIGS. 4, 7 or 8 are marked with the same numerals and the description thereof will be omitted for brevity. Although in the first embodiment the first reflector 17, photodetector 15 and the reflection type holographic optical element 14 are formed on the same semiconductor substrate 13 and the semiconductor laser source 11 is formed on the semiconductor substrate 12, in this embodiment the photodetector 15 and reflection type holographic optical element 14 are formed on the semiconductor substrate 13 and a surface emitting laser source 23 is used in place of the semiconductor laser source 11. This arrangement does not require the first reflector 17. The surface emitting laser source 23 is formed on the semiconductor substrate 12 and then mounted on the semiconductor substrate 13. In FIG. 9, as well as the first embodiment, the beam 70 emitted from the surface emitting laser source 23 is reflected on the reflector 18 and further reflected on the reflection type holographic optical element 14 and then focused on the optical storage medium 20 through the objective lens 19. The beam 70 reflected and diffracted on the optical storage medium 20 is incident on the reflection type holographic optical element 14 so as to become the diffraction beams 71 and 72 which are in turn reflected on the reflector 18 to be incident on the photodetector 15. As well as the above-described first embodiment, since the photodetector 15 and reflection type holographic optical element 14 are formed on the same semiconductor substrate 13, the relative positional relation therebetween can be determined with a high accuracy below about 1 micron, thereby not requiring the positional or rotational adjustment of the reflection type holographic optical element 14 and the photodetector 15 in assembling the optical pick-up head apparatus. Similarly, it is possible to provide the optical pick-up head apparatus which is capable of stably obtaining the signals irrespective of no adjustment. Although in the first to third embodiments the beam 70 emitted from the semiconductor laser source 11 are reflected on three portions of the reflectors 17, 18 and the reflection type holographic optical element 14, in this embodiment the beam 70 emitted from the surface emitting laser source 23 is reflected on the two portions of the reflector 18 and the reflection type holographic optical element 14. Thus, it is possible to keep the quality of the wavefront excellent. That is, it is possible to more appropriately converge the beam 70 on the optical storage medium 20 so as to obtain the necessary signals with a higher accuracy.

Fifth Embodiment

Figure 10:
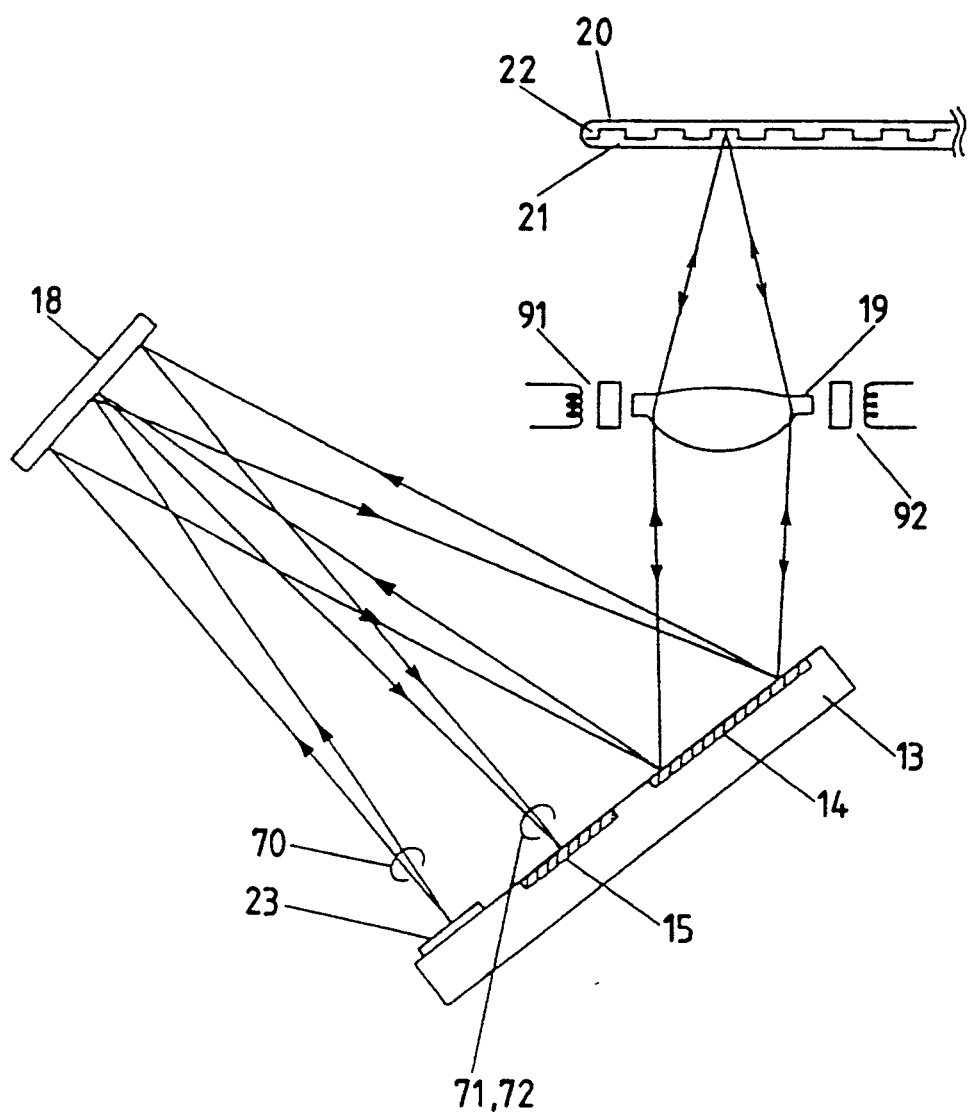
FIG. 10 shows an arrangement of an optical pick-up head apparatus according to a fifth embodiment of this invention.

Still further, a description will be made hereinbelow in terms of a fifth embodiment of this invention. FIG. 10 shows an optical pick-up head apparatus according to the fifth embodiment where parts corresponding to those in FIG. 9 are marked with the same numerals. Although in the fourth embodiment the photodetector 15 and reflection type holographic optical element 14 are formed on the same semiconductor substrate 13 and the surface emitting laser source 23 is formed on the semiconductor substrate 12, in this embodiment the surface emitting laser 23, photodetector 15 and reflection type holographic optical element 14 are formed on the same semiconductor substrate 13. As well as the fourth embodiment, the beam 70 emitted from the surface emitting laser source 23 is reflected on the reflector 18 and the reflection type holographic optical element 14 and then focused on the optical storage medium 20 through the objective lens 19. The beam 70 reflected and diffracted on the optical storage medium 20 is incident on the reflection type holographic optical element 14 to become the first order diffraction beams 71 and 72 which are in turn incident on the photodetector 15 after being reflected on the reflector 18. According to this embodiment, the surface emitting laser source 23 is used as a light source and, together with the photodetector 15 and reflection type holographic optical element 14, is formed on the semiconductor substrate 13. Thus, this embodiment can offer both the effects of the above-described third and fourth embodiments.

Sixth Embodiment

Figure 11:
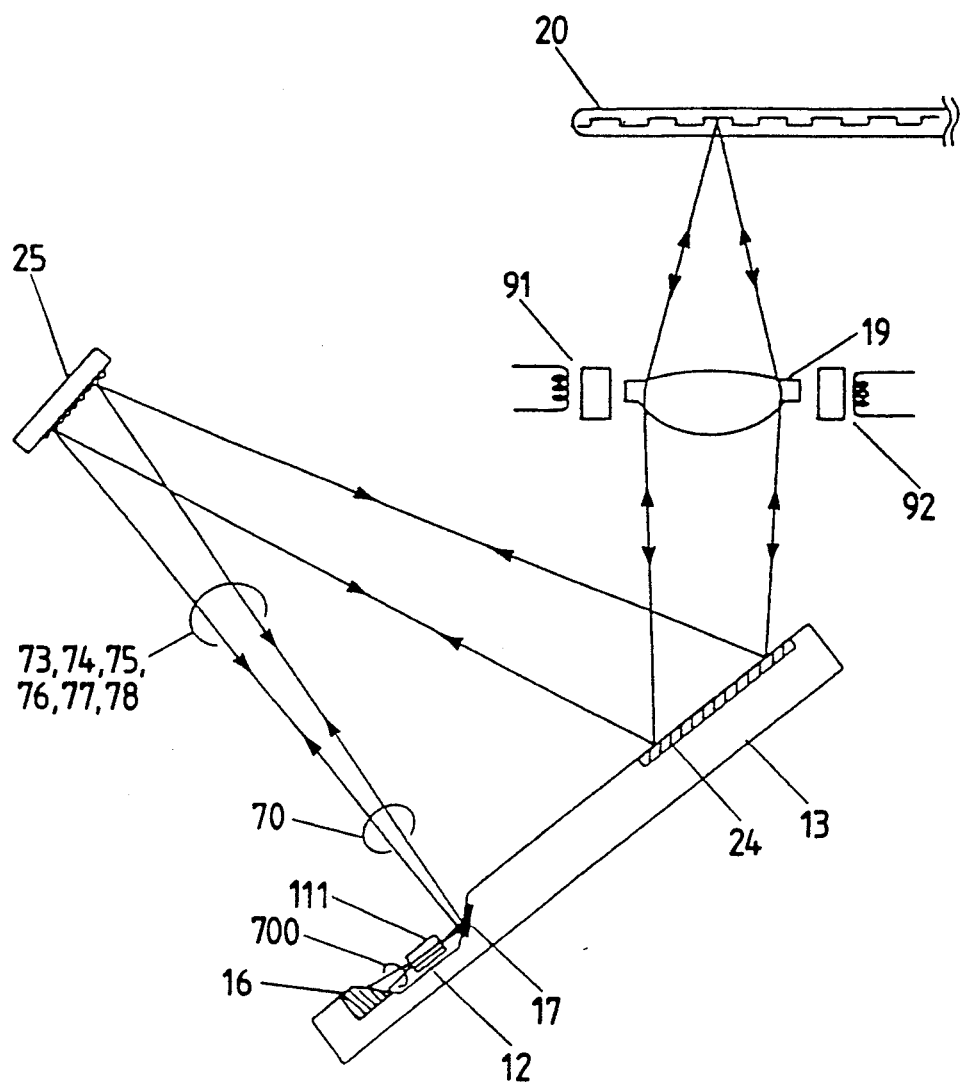
FIG. 11 shows an arrangement of an optical pick-up head apparatus according to a sixth embodiment of this invention.

Moreover, a description will be made hereinbelow in terms of a sixth embodiment of this invention. FIG. 11 shows an optical pick-up head apparatus according to the sixth embodiment of this invention where parts corresponding to those in FIG. 4 are marked with the same numerals and the description thereof will be omitted. In comparison with the optical pick-up head apparatus according to the first embodiment, in this embodiment a reflection type diffraction grating 25 is used in place of the reflector 18. This reflection type diffraction grating 25 is responsive to the beam 70 from the semiconductor laser source 11 to generate a zero order diffraction beam and two first order diffraction beams. In addition, a reflection type holographic optical element 24 is used in place of the reflection type holographic optical element 14. This reflection type holographic optical element 24 has in its hologram area a pattern different from that of the reflection type holographic optical element 14.

The semiconductor laser source 11 emits the laser beam 70 toward the reflector 17 in a direction parallel to the surface of the semiconductor substrate 12. The beam 70 reflected on the reflector 17 is further reflected on the reflection type diffraction grating 25 and reflection type holographic optical element 24 so as to be incident on the optical storage medium 20 through the objective lens 19. At this time, the beam 70 to be focused on the optical storage medium 20 becomes three beams: one zero order diffraction beam and two first order diffraction beams by the reflection type diffraction grating 25, while in FIG. 11 only the zero order diffraction beam is illustrated. After passing through the objective lens 19, the three beams reflected and diffracted on the optical storage medium 20 are again reflected on the reflection type holographic optical element 24 so as to increase the number of diffraction beams. The first order diffraction beams produced by the reflection type holographic optical element 24 at this time are illustrated at numerals 73 to 78. These first order diffraction beams 73 to 78 are reflected on the reflection type diffraction grating 25 and then incident on photodetectors 26 and 27 (not illustrated in FIG. 11 but illustrated in FIG. 13). Here, the reflection type diffraction grating 25 is arranged so as not to generate diffraction beams in response to the first order diffraction beams 73 to 78 incident thereon from the reflection type holographic optical element 24 as described below. That is, the reflection type diffraction grating 25 merely reflects the first order diffraction beams 73 to 78 toward the photodetectors 26 and 27.

Figure 12:
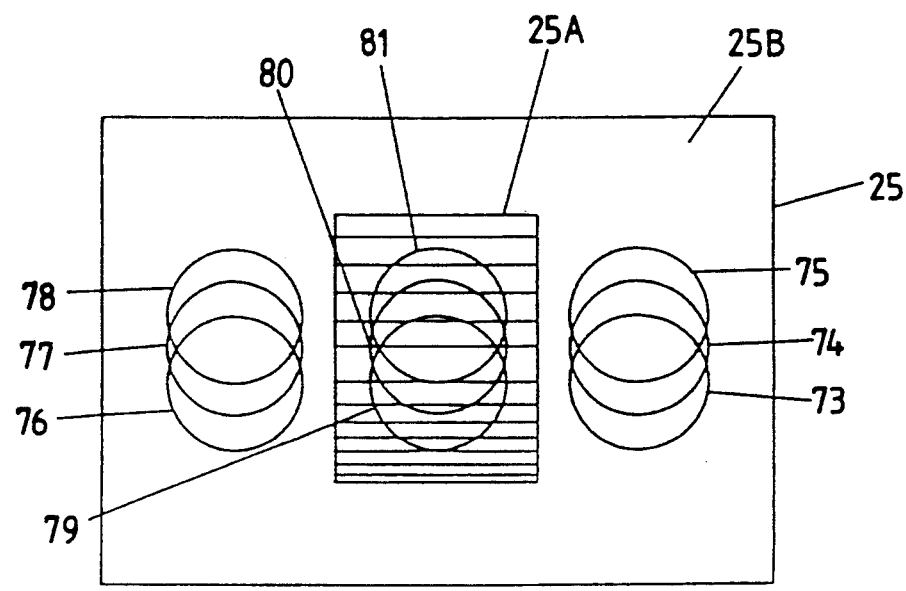
FIG. 12 shows an arrangement of a reflector to be used in the FIG. 11 optical pick-up head apparatus.

FIG. 12 shows the first order diffraction beams 73 to 78 incident from the reflection type holographic optical element 24 on the reflection type diffraction grating 25. As seen from FIG. 12, the reflection type diffraction grating 25 comprises a diffraction grating area 25A having a pattern whereby a diffraction beam generates and a reflection area 25B not having a pattern to act as a reflector only. The first order diffraction beams 73 to 78 are designed to be incident on the reflection area 25B. In FIG. 12, numerals 79 to 81 are zero order diffraction beams produced by the reflection type holographic optical element 24 in response to the reflected light from the optical storage medium 20.

Figure 13:
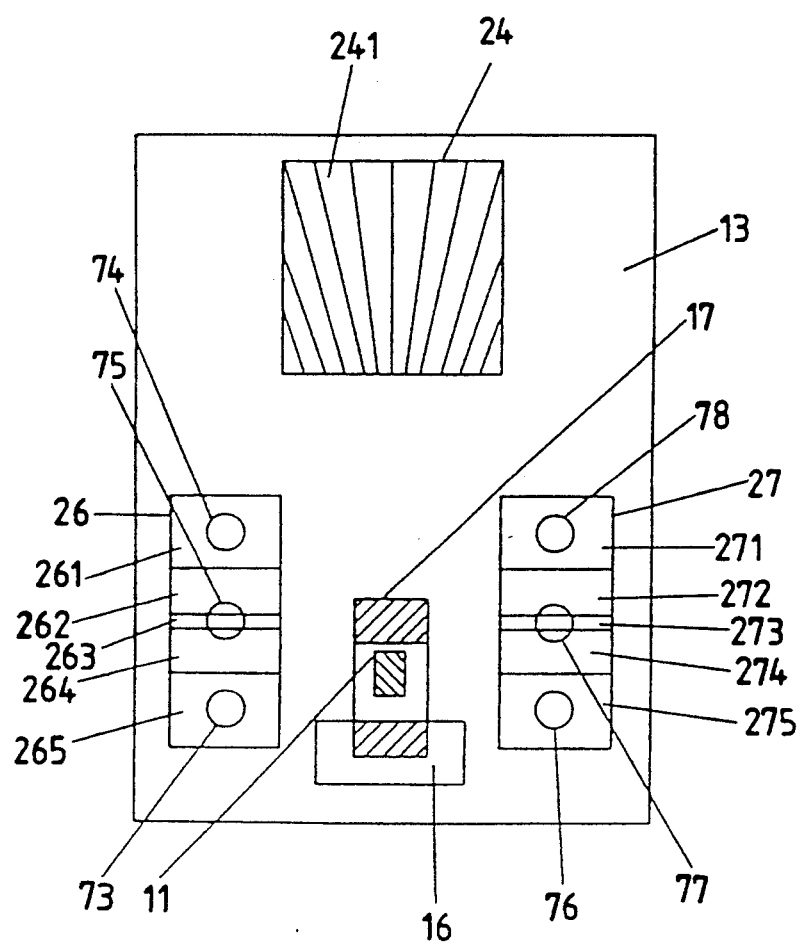
FIG. 13 is top view showing an arrangement of a semiconductor substrate to be used in the FIG. 11 optical pick-up head apparatus.

FIG. 13 is a top view showing the semiconductor substrate 13. As seen from FIG. 13, the reflection type holographic optical element 24 has one hologram area 241. Since the three beams are produced due to the reflection type diffraction grating 25 as described above, the number of the beams reflected and diffracted on the optical storage medium 20 to be incident on the reflection type holographic optical element 24 is also three. The reflection type holographic optical element 24 produces three+first order diffraction beams and three+first order diffraction beams. The beams 73 to 75 are the+first order diffraction beams due to the reflection type holographic optical element 24 and the beams 76 to 78 are the−first order diffraction beams due to the same reflection type holographic optical element 24. On the semiconductor substrate 13 there are formed the photodetector 26 comprising photodetecting elements 261 to 265 and the photodetector 27 comprising photodetecting elements 271 to 275. The first order diffraction beams 73 from the reflection type holographic optical element 24 is received by the photodetecting element 265 of the photodetector 26, the first order diffraction beam 74 therefrom is received by the photodetecting elements 262 to 264, and the first order diffraction beam 75 therefrom is received by the photodetecting element 261. Further, the first order diffraction beam 76 from the reflection type holographic optical element 24 is received by the photodetecting element 275 of the photodetector 27, the first order diffraction beam 77 is received by the photodetecting elements 272 to 274, and the first order diffraction beam 78 is received by the photodetecting element 271. Here, the pattern of the reflection type holographic optical element 24 and the arrangements of the photodetectors 26 and 27 are made so that the two first order diffraction beams 74 and 77 have the same beam diameter on the photodetectors 26 and 27 when the beam 70 from the semiconductor laser source 11 is focused on the optical storage medium 20, while the focal point (converged point) of the first order diffraction beam 74 is positioned at the front side of the photodetector 26 and the focal point of the first order diffraction beam 77 is positioned at the rear side of the photodetector 27. A designing method of such a holographic optical element and a signal detecting method which will be described hereinbelow are known as exemplified in the U.S. Pat. No. 4,929,823.

Figure 14A:
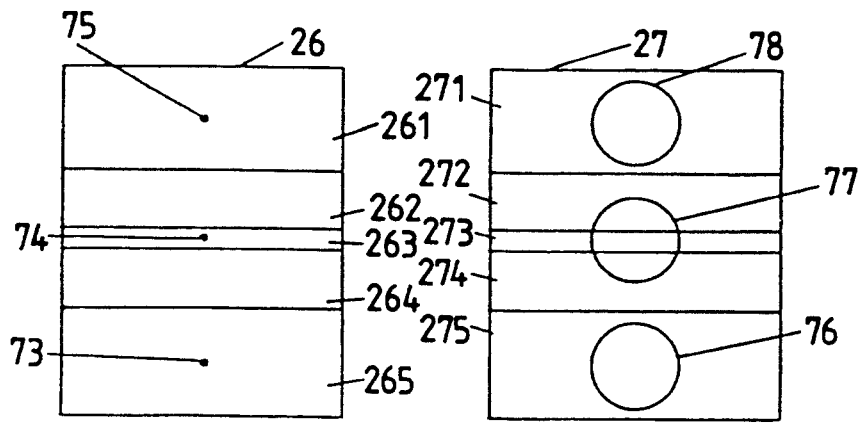
FIGS. 14A to 14C are illustrations for describing a signal detecting method in the FIG. 11 optical pick-up head apparatus.
Figure 14B:
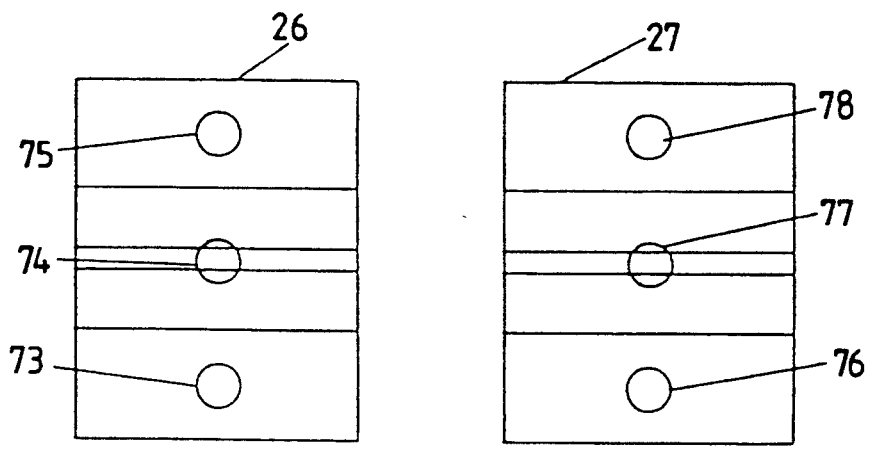
Figure 14C:
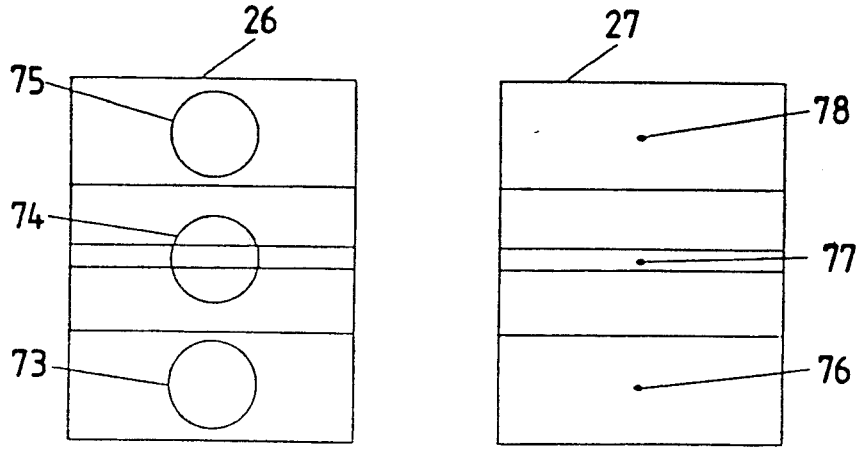

Secondly, a detailed description will be made in terms of a signal detecting method in the sixth embodiment of this invention. FIGS. 14A to 14C show the first order diffraction beams 73 to 78 on the photodetecting elements 261 to 265 of the photodetector 26 and the photodetecting elements 271 to 275 of the photodetector 27. FIG. 14B shows the case that the beam 70 emitted from the semiconductor laser source 11 is focused on the optical storage medium 20, and FIGS. 14A and 14C respectively show the defocusing states with respect to the optical storage medium 20. For example, the FE signal can be obtained by the differential operation between the outputs of the photodetecting elements 263 and 273. Here, for example, when the outputs of the photodetecting elements 272 and 274 are added to the output of the photodetecting element 263 and the outputs of the photodetecting elements 262 and 264 are added to the output of the photodetecting element 273, the differential output enhances. After the necessary processes such as the amplification, phase-compensation and band-limitation, the FE signal is supplied to the focusing control actuator 91 shown in FIG. 11 so that the position of the objective lens 19 in the focusing direction is controlled whereby the focal point of the objective lens 19 is at a desired position on the optical storage medium 20. On the other hand, the TE signal can be obtained by the differential operation between the outputs of the photodetecting elements 261 and 265, for example. Here, if the output of the photodetecting element 271 is added to the output of the photodetecting element 261 and the output of the photodetecting element 275 is added to the output of the photodetecting element 265, the differential output increases. As well as the FE signal, the TE signal is also amplified, phase-compensation-processed and band-limitation-processed and then supplied to the tracking control actuator 92 shown in FIG. 11, whereby the position of the objective lens 19 in the radial direction of the optical storage medium 20 is controlled so that the focal point of the objective lens 19 is at a desired position such as a pit, track, groove or land of the optical storage medium 20. Further, the RF signal can be obtained by the total sum of the outputs of the photodetecting elements 262 to 264 and 272 to 274. The RF signal is led to a signal processing circuit, not shown, to obtain the information recorded on the optical storage medium 20. The above-mentioned FE signal detecting method is so-called spot size detection method and the above-mentioned TE signal detecting method is so-called three-beam method.

Here, although in this embodiment the reflection type diffraction grating 25 is used for producing the three beams, this invention is not limited thereto. It is also appropriate that a diffraction grating is disposed at a desired position in the optical path that the beam 70 emitted from the semiconductor laser source 11 reaches the reflection type holographic optical element 24. Further, the diffraction grating is not limited to the reflection type. It is possible to use a transmission type diffraction grating.

Seventh Embodiment

Figure 15:
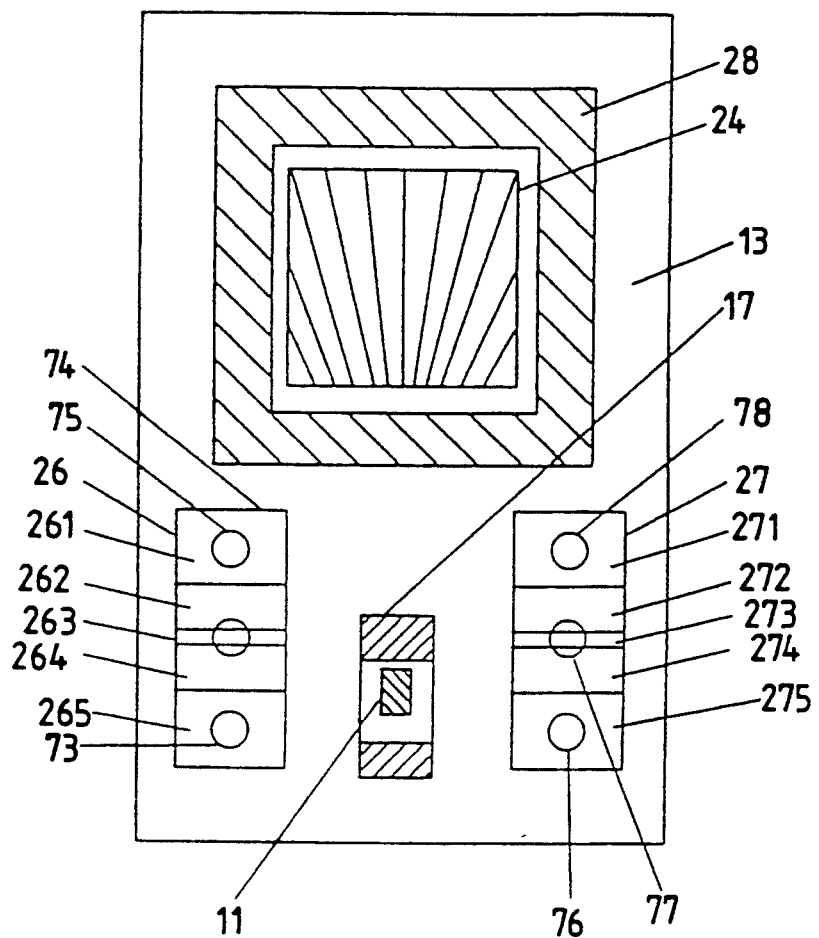
FIG. 15 is a top view showing a semiconductor substrate to be used in an optical pick-up head apparatus according to a seventh embodiment of this invention.

Further, a description will be made hereinbelow in terms of a seventh embodiment of this invention. FIG. 15 is a top view of a semiconductor substrate 13 of an optical puck-up head apparatus according to the seventh embodiment where parts corresponding to those in FIG. 13 are marked with the same numerals. Although in the above-described first or sixth embodiment the two beams 70 and 700 are emitted from the semiconductor laser source 11 and received by the photodetectors 15 and 16, respectively, in this embodiment the reflectance of the reflection surface of the rear side of the semiconductor laser source which constitutes a laser resonator is set to about 100% and only the beam 70 is emitted from the semiconductor laser source 11 and a photodetector 28 for receiving a portion of the beam 70 emitted is formed to surround the reflection type holographic optical element 24. Generally, the divergent angle of the beam emitted from the semiconductor laser source 11 is about 8° to 50° in full angle at half maximum and is considerably greater than the effective aperture of an objective lens. As a result, only a portion of the divergent beam 70 from the semiconductor laser source 11 is focused on the optical storage medium 20 through the objective lens 19. In this embodiment the other portion of the divergent beam 70 directing to the outside of the aperture of the objective lens 19 is arranged to be received by the photodetector 28. In the case that as arranged in the first embodiment the beam 700 is additionally emitted from the rear side of the semiconductor laser source 11 and received by the photodetector 16 so as to obtain a reference signal for a control circuit to make constant the output of the semiconductor laser source 11, the threshold of the inrush current for the oscillation of the semiconductor laser source 11 tends to become large. On the other hand, in this embodiment, since only the beam 70 is emitted from the semiconductor laser source 11 and the portion of the beam 70 advancing to the outside of the aperture of the objective lens 19 is received by the photodetector 28, the light utilization efficiency can be improved to obtain the reference signal for the control circuit, which keeps the output of the semiconductor laser source 11, without increasing the threshold of the inrush current. Thus, the demand of the optical pick-up head apparatus according to this embodiment becomes low and the stability of the optical pick-up head becomes high. Generally, in the case that a photodetector is provided as a different part at the outside of the objective lens in order to suppress the demand of the semiconductor laser source 11, the number of parts of the optical pick-up apparatus increases and the number of steps in assembling also increases to increase the cost of the optical pick-up head apparatus. However, according to this embodiment, since as illustrated in FIG. 15 the photodetector 28 is provided around the reflection type holographic optical element 24, it is possible to substantially prevent the increase in the number of parts or steps to suppress the increase in the cost of the optical pick-up head apparatus.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described first to seventh embodiments the FE signal is obtained in accordance with the double knife edge method and the TE signal is obtained in accordance with the push-pull method or three beam method, this invention is not limited to these method. This invention can use the astigmatic aberration method or phase difference method for the detection of the FE signal and use the phase difference method or wobbling method for the detection of the TE signal.

What is claimed is:

1. An optical pick-up head apparatus comprising:
    a semiconductor laser source for emitting a coherent or semimonochromatic beam;
    first reflection means for reflecting said beam from said semiconductor laser source to change the advancing direction of said beam therefrom;
    second reflection means for reflecting the beam reflected on said first reflection means to change the advancing direction thereof;
    third reflection means for reflecting the beam reflected on said second reflection means to change the advancing direction thereof;
    a converging optical system for receiving the beam reflected on said third reflection means to focus the beam on a microscopic spot on an optical storage medium;
    a reflection type holographic optical element for receiving the beam reflected and diffracted on said optical storage medium to generate a diffraction beam; and
    a photodetector having a plurality of photodetecting elements to receive said diffraction beam from said reflection type holographic optical element to generate a photoelectric conversion signal,
    wherein said laser source is formed on a first semiconductor substrate so that said beam from said laser source is emitted in a direction substantially parallel to a surface of said first semiconductor substrate, said reflection type holographic optical element is formed in said third reflection means, said diffraction beam from said reflection type holographic optical element is incident on said photodetector after being reflected on said second reflection means, said first reflection means, said third reflection means and said photodetector are formed on a second semiconductor substrate, a light-receiving surface of said photodetector is arranged to be substantially parallel to a surface of said second semiconductor substrate, and said surface of said first semiconductor substrate is disposed to be substantially parallel to said surface of said second semiconductor substrate.

2. An optical pick-up head apparatus as claimed in claim 1, wherein a diffraction grating is disposed in an optical path of the beam from said semiconductor laser source to said reflection type holographic optical element.

3. An optical pick-up head apparatus as claimed in claim 1, wherein a reflection type diffraction grating is provided in said second reflection means;

4. An optical pick-up head apparatus as claimed in claim 1, further comprising a second photodetector disposed on said second semiconductor substrate for receiving a portion of said beam from said semiconductor laser source which is not reflected and diffracted on said optical storage medium.

5. An optical pick-up head apparatus as claimed in claim 4, wherein said second photodetector is disposed to surround said reflection type holographic optical element.

6. An optical pick-up head apparatus comprising:

a semiconductor laser source for emitting a coherent or semimonochromatic beam;

first reflection means for reflecting said beam from said semiconductor laser source to change the advancing direction of said beam therefrom;

second reflection means for reflecting the beam reflected on said first reflection means to change the advancing direction thereof;

third reflection means for reflecting the beam reflected on said second reflection means to change the advancing direction thereof;

a converging optical system for receiving the beam reflected on said third reflection means to focus the beam on a microscopic spot on an optical storage medium;

a reflection type holographic optical element for receiving the beam reflected and diffracted on said optical storage medium to generate a diffraction beam; and a photodetector having a plurality of photodetecting elements to receive said diffraction beam from said reflection type holographic optical element to generate a photoelectric conversion signal, wherein said laser source and said first reflection means are formed on a first semiconductor substrate, said beam from said laser source is emitted in a direction substantially parallel to a surface of said first semiconductor substrate, said reflection type holographic optical element is formed in said third reflection means, said diffraction beam from said reflection type holographic optical element is incident on said photodetector after being reflected on said second reflection means, said third reflection means and said photodetector are formed on a second semiconductor substrate, a light-receiving surface of said photodetector is arranged to be substantially parallel to a surface of said second semiconductor substrate, and said surface of said first semiconductor substrate is disposed to be substantially parallel to said surface of said second semiconductor substrate.

7. An optical pick-up head apparatus as claimed in claim 6, wherein a diffraction grating is disposed in an optical path of the beam from said semiconductor laser source to said reflection type holographic optical element.

8. An optical pick-up head apparatus as claimed in claim 6, wherein a reflection type diffraction grating is provided in said second reflection means.

9. An optical pick-up head apparatus as claimed in claim 6, further comprising a second photodetector disposed on said second semiconductor substrate for receiving a portion of said beam from said semiconductor laser source which is not reflected and diffracted on said optical storage medium.

10. An optical pick-up head apparatus as claimed in claim 9, wherein said second photodetector is disposed to surround said reflection type holographic optical element.

11. An optical pick-up head apparatus comprising:

a semiconductor laser source for emitting a coherent or semimonochromatic beam;

first reflection means for reflecting said beam from said semiconductor laser source to change the advancing direction of said beam therefrom;

second reflection means for reflecting the beam reflected on said first reflection means to change the advancing direction thereof;

third reflection means for reflecting the beam reflected on said second reflection means to change the advancing direction thereof;

a converging optical system for receiving the beam reflected on said third reflection means to focus the beam on a microscopic spot on an optical storage medium;

a reflection type holographic optical element for receiving the beam reflected and diffracted on said optical storage medium to generate a diffraction beam; and a photodetector having a plurality of photodetecting elements to receive said diffraction beam from said reflection type holographic optical element to generate a photoelectric conversion signal, wherein said laser source, said first reflection means, said third reflection means and said photodetector are formed on one semiconductor substrate, said beam from said laser source is emitted in a direction substantially parallel to a surface of said semiconductor substrate, said reflection type holographic optical element is formed in said third reflection means, said diffraction beam from said reflection type holographic optical element is incident on said photodetector after being reflected on said second reflection means, and a light-receiving surface of said photodetector is arranged to be substantially parallel to a surface of said semiconductor substrate.

12. An optical pick-up head apparatus as claimed in claim 11, wherein a diffraction grating is disposed in an optical path of the beam from said semiconductor laser source to said reflection type holographic optical element.

13. An optical pick-up head apparatus as claimed in claim 11, wherein a reflection type diffraction grating is provided in said second reflection means.

14. An optical pick-up head apparatus as claimed in claim 11, further comprising a second photodetector disposed on said semiconductor substrate for receiving a portion of said beam from said semiconductor laser source which is not reflected and diffracted on said optical storage medium.

15. An optical pick-up head apparatus as claimed in claim 14, wherein said second photodetector is disposed to surround said reflection type holographic optical element.

16. An optical pick-up head apparatus comprising:

a semiconductor laser source for emitting a coherent or semi-monochromatic beam;

first reflection means for reflecting said beam from said semiconductor laser source to change the advancing direction of said beam therefrom;

second reflection means for reflecting the beam reflected on said first reflection means to change the advancing direction thereof;

a converging optical system for receiving the beam reflected on said second reflection means to focus the beam on a microscopic spot on an optical storage medium;

a reflection type holographic optical element for receiving the beam reflected and diffracted on said optical storage medium to generate a diffraction beam; and a photodetector having a plurality of photodetecting elements to receive said diffraction beam from said reflection type holographic optical element to generate a photoelectric conversion signal, wherein said reflection type holographic optical element is formed in said second reflection means, said diffraction beam from said reflection type holographic optical element is incident on said photodetector after being reflected on said first reflection means, said laser source is formed on a first semiconductor substrate, said beam from said laser source is emitted in a direction substantially parallel to a surface of said first semiconductor substrate, said second reflection means and said photodetector are formed on a second semiconductor substrate, a light-receiving surface of said photodetector is arranged to be substantially parallel to a surface of said second semiconductor substrate, and said first semiconductor substrate is disposed on said second semiconductor substrate so that said surface of said first semiconductor substrate is substantially parallel to said surface of said second semiconductor substrate.

17. An optical pick-up head apparatus as claimed in claim 16, wherein a diffraction grating is disposed in an optical path of the beam from said semiconductor laser source to said reflection type holographic optical element.

18. An optical pick-up head apparatus as claimed in claim 16, wherein a reflection type diffraction grating is provided in said first reflection means.

19. An optical pick-up head apparatus as claimed in claim 16, further comprising a second photodetector disposed on said second semiconductor substrate for receiving a portion of said beam from said semiconductor laser source which is not reflected and diffracted on said optical storage medium.

20. An optical pick-up head apparatus as claimed in claim 19, wherein said second photodetector is disposed to surround said reflection type holographic optical element.

21. An optical pick-up head apparatus comprising:
a semiconductor laser source for emitting a coherent or semi-monochromatic beam;
first reflection means for reflecting said beam from said semiconductor laser source to change the advancing direction of said beam therefrom;
second reflection means for reflecting the beam reflected on said first reflection means to change the advancing direction thereof;
a converging optical system for receiving the beam reflected on said second reflection means to focus the beam on a microscopic spot on an optical storage medium;
a reflection type holographic optical element for receiving the beam reflected and diffracted on said optical storage medium to generate a diffraction beam; and
a photodetector having a plurality of photodetecting elements to receive said diffraction beam from said reflection type holographic optical element to generate a photoelectric conversion signal, wherein said reflection type holographic optical element is formed in said second reflection means, said diffraction beam from said reflection type holographic optical element is incident on said photodetector after being reflected on said first reflection means, said laser source, said second reflection means and said photodetector are formed on one semiconductor substrate, said beam from said laser source is emitted in a direction substantially parallel to a surface of said semiconductor substrate, and a light-receiving surface of said photodetector is arranged to be substantially parallel to a surface of said semiconductor substrate.

22. An optical pick-up head apparatus as claimed in claim 21, wherein a diffraction grating is disposed in an optical path of the beam from said semiconductor laser source to said reflection type holographic optical element.

23. An optical pick-up head apparatus as claimed in claim 21, wherein a reflection type diffraction grating is provided in said first reflection means.

24. An optical pick-up head apparatus as claimed in claim 21, further comprising a second photodetector disposed on said semiconductor substrate for receiving a portion of said beam from said semiconductor laser source which is not reflected and diffracted on said optical storage medium.

25. An optical pick-up head apparatus as claimed in claim 24, wherein said second photodetector is disposed to surround said reflection type holographic optical element.

* * * * *

UNITED STATES PATENT AND TRADEMARK OFFICE
CERTIFICATE OF CORRECTION

PATENT NO. : 5,293,038
DATED : March 8, 1994
INVENTOR(S) : Shinichi KADOWAKI et al.

It is certified that error appears in the above-indentified patent and that said Letters Patent is hereby corrected as shown below:

On the title page, item [54] and column 1, line 3, delete "HOLLOGRAPHIC" and insert --HOLOGRAPHIC--

Signed and Sealed this

Twenty-fifth Day of October, 1994

Attest:

BRUCE LEHMAN

*Attesting Officer*  *Commissioner of Patents and Trademarks*